United States Patent [19]
Smith et al.

[11] Patent Number: 4,884,935
[45] Date of Patent: Dec. 5, 1989

[54] COLLAPSIBLE TRANSPORTER MODULE AND METHOD OF USING SAME

[75] Inventors: Garry D. F. Smith, Orangeville; William Manderson, Ontario, both of Canada

[73] Assignees: Xerox Canada, Inc.; Associated Management Group, both of Mississauga, Canada

[21] Appl. No.: 860,369
[22] Filed: May 6, 1986
[51] Int. Cl.⁴ .................................................. A47F 5/08
[52] U.S. Cl. ..................................... 414/498; 414/572; 108/149; 211/118; 211/149; 220/6
[58] Field of Search ............... 414/498, 400, 352, 353, 414/402, 572, 786; 108/111, 149; 211/113, 118, 149, 186; 220/1.5, 6, 7; 104/137, 91, 89

[56] References Cited
U.S. PATENT DOCUMENTS

| | | | |
|---|---|---|---|
| 293,832 | 2/1884 | Widman | 104/89 |
| 1,196,762 | 9/1916 | Cunningham | |
| 1,225,607 | 5/1917 | Ford et al. | 211/149 X |
| 1,341,996 | 6/1920 | Plucienski | 104/91 |
| 1,566,551 | 12/1925 | Ma Ghrand | |
| 1,738,030 | 12/1929 | Bebb | |
| 2,159,672 | 5/1939 | Owen | 280/36 |
| 2,253,423 | 8/1941 | Fellers | 224/29 |
| 2,440,513 | 4/1948 | Kaelin | 211/178 |
| 2,657,810 | 11/1953 | Garrick | 211/90 |
| 2,771,196 | 11/1956 | Scheuermann | 211/94 |
| 2,818,317 | 12/1957 | Little, Jr. | 311/21 |
| 2,921,688 | 1/1960 | Riemenschneider | 211/2 |
| 3,040,917 | 6/1962 | Bonnin | 214/75 |
| 3,063,570 | 11/1962 | Kroner | 211/113 |
| 3,162,417 | 12/1964 | Briggs | 248/345.1 |
| 3,218,987 | 11/1965 | Michel | 104/98 |
| 3,399,794 | 9/1968 | Hummel | 414/498 X |
| 3,891,102 | 6/1975 | Blount | 214/75 T |
| 4,101,109 | 7/1978 | Edwards | 248/317 |
| 4,227,669 | 10/1980 | McInnis | 248/317 |
| 4,295,432 | 10/1981 | Hulke | 108/149 |
| 4,329,789 | 5/1982 | Erickson | 34/195 |
| 4,523,526 | 6/1985 | O'Neill | 108/149 |
| 4,538,738 | 9/1985 | Van Iperen | 211/162 |
| 4,595,106 | 6/1986 | Kunze et al. | 211/149 X |

FOREIGN PATENT DOCUMENTS 222248 10/1924 United Kingdom ................ 108/149

Primary Examiner—Robert J. Spar
Assistant Examiner—Robert S. Katz

[57] ABSTRACT

This invention relates to a collapsible transporter module, and the method of using same, for transporting large volumes of unpackaged goods in spaced padded relationship in conventional transportation vehicles such as trains, trucks, ships or containers. The transport module consists of a mounting for the module in the transportation vehicle; a rigid upper frame suspended from the mounting; a plurality of vertically elongate collapsible support members having an upper end and a lower end, the upper end being attached to the upper rigid frame; and a plurality of vertically spaced apart shelf members supported from the support members. When not loaded with goods being transported, the transporter module may be stored in a collapsed mode, thereby allowing the transportation vehicle to return the transporter module to the goods supplier, together with a new payload.

1 Claim, 4 Drawing Sheets

COLLAPSIBLE TRANSPORTER MODULE AND METHOD OF USING SAME

This invention relates to a transporter module, and to a method of using the same, for transporting large volumes of goods. This invention more particularly relates to the shipping of unpackaged goods in spaced, padded relationship in conventional transportation vehicles such as trains, trucks, ships or containers.

Manufacturers are now commonly adopting a "just in time" (JIT) inventory strategy, having only a minimum of inventory on hand at the manufacturing or assembly facility, to lower costs associated with having larger inventories. This strategy necessitates daily shipping of components in some cases.

The JIT inventory strategy is used by large manufacturers, such as car and computer manufacturers. Often, the components for such manufacturers tend to be both bulky, and somewhat fragile. Previously, each component required by the manufacturer had to be individually packaged by the supplier, loaded into the transportation vehicle at the supplier's plant, transported, off-loaded from the transportation vehicle at the manufacturing assembly plant, unpackaged, and then moved within the assembly plant to where it is needed in the assembly line.

Several disadvantages are inherent to the method of packaging and transporting as outlined above. A great deal of time and labour is spent at both the shipping and receiving ends for packing and unpacking respectively the goods being shipped. Not only is the packing and unpacking costly, but it is wasteful, as it requires a large amount of packaging material which typically can only be used once. This used packaging material then has to be disposed of at the assembly plant by the manufacturer.

To overcome the time and expense incurred and the waste created, mobile storage racks are used in some cases. Such racks typically are made from sheet metal and have ground-engaging wheels and a honeycomb of padded spaces to accommodate the goods being transported. Typically, each padded space is loaded with a single component during shipping.

The racks are loaded into the transportation vehicle in a crossways manner, and a number of racks are packed from front to back in the vehicle. Such racks eliminate the need for individual packaging of the components, thereby saving time, labour, and packaging materials.

However, the racks are unsatisfactory for a number of reasons. Their chief drawback is that on the return trip of the transportation vehicle, there is no room to carry any payload. The empty racks must be returned to the supplier of the component for the next day's shipment. As the padded spaces in the racks are specifically designed to carry a particular component, it is very seldom that a return payload is available. Therefore, the racks are invariably returned to the supplier empty.

The racks can be expensive to manufacture; if a new size of component is necessitated, for example by a change of styling in the finished product, as often happens, the racks can become obsolete. In addition, keeping track of where the racks are located, as they are shipped daily from place to place, can become exceedingly difficult. Further, because the racks are typically made from rigid sheet metal they can be dented and damaged quite easily while being loaded and unloaded from the transportation vehicle.

According to the present invention there is provided a collapsible transporter module for transporting goods in a transportation vehicle. The module has a means for mounting the module in the transportation vehicle; a rigid upper frame suspended from the mounting means; a plurality of vertically elongate collapsible support members having an upper end and a lower end, the upper end being attached to the upper rigid frame; and, a plurality of vertically spaced apart shelf members supported from said support members.

In the drawings which illustrate embodiments of the invention:

Figure 1:
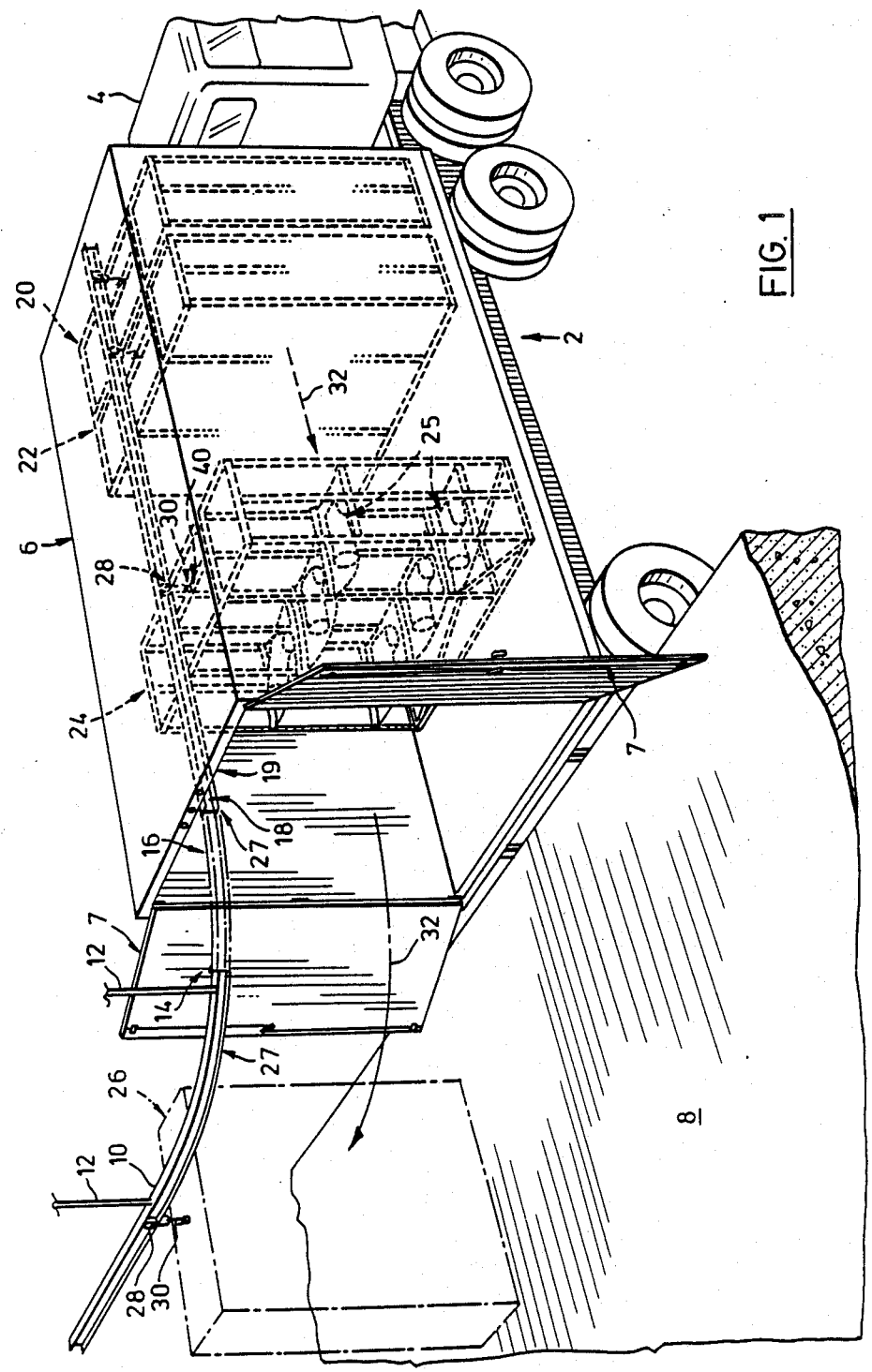
FIG. 1 is a perspective view showing a number of uncollapsed transporter modules being unloaded from a transportation vehicle.

FIG. 1 shows a transportation vehicle, indicated generally at 2, being unloaded. The vehicle 2 has a cab 4 and a body 6. The body 6 has rearwardly opening doors 7, which are shown in the open position. The vehicle 2 is backed up to a loading bay 8, of a manufacturing plant (not otherwise shown).

The loading bay 8 has an overhead rail 10, which is suspended from supports 12. The rail 10 leads from the loading bay 8, into the plant, and has a hinge 14 and an adjustable portion 16. The hinge 14 allows adjustable portion 16 to be aligned properly to transportation vehicle 2, to facilitate the unloading or loading of the transportation vehicle 2.

An overhead rail 18 is suspended in the body 6 of transportation vehicle 2, preferably near a roof 19 thereof. The overhead rail 18 is preferably suspended from standard load bars (not shown) which are commonly used in transportation vehicles to store and locate the goods being transported. Because the rail 18 is suspended from such standard load bars, no modification of the transportation vehicle is necessary to practice this invention; conventional load bar locking mechanisms can be used to locate the load bars from which the rail 18 is suspended.

Suspended from rail 18 are shown, in ghost outline, three transporter modules 20, 22 and 24. Suspended from rail 10 in loading bay 8 is shown, in ghost outline, a transporter module 26. Both rail 18 and rail 10 are preferably in the shape of an I-beam, but it will be appreciated that other standard types of rails will work equally well. Each of rails 18 and 10 has a respective lower flange 27.

Connecting transporter modules 20, 22, 24 and 26 to rails 18 and 10 are four mounting means, one for each module. Each mounting means comprises rolling wheels 28, and hook 30. Each mounting means has two wheels 28, one on each side of lower flange 27. Wheels 28 roll along lower flange 27 facilitating the easy movement of modules 20, 22, 24 and 26. As shown in FIG. 1, the modules 20, 22, 24 and 26 are being unloaded from transportation vehicle 2, by being moved along rail 18, and then rail 10, in the direction of arrows 32. The mounting means also includes a loop 40 on each transporter module 20, 22, 24 and 26, as shown in FIG. 2 and described below.

Referring specifically to transporter module 24, also shown in ghost outline are components 25, which are the goods being transported.

Figure 2:
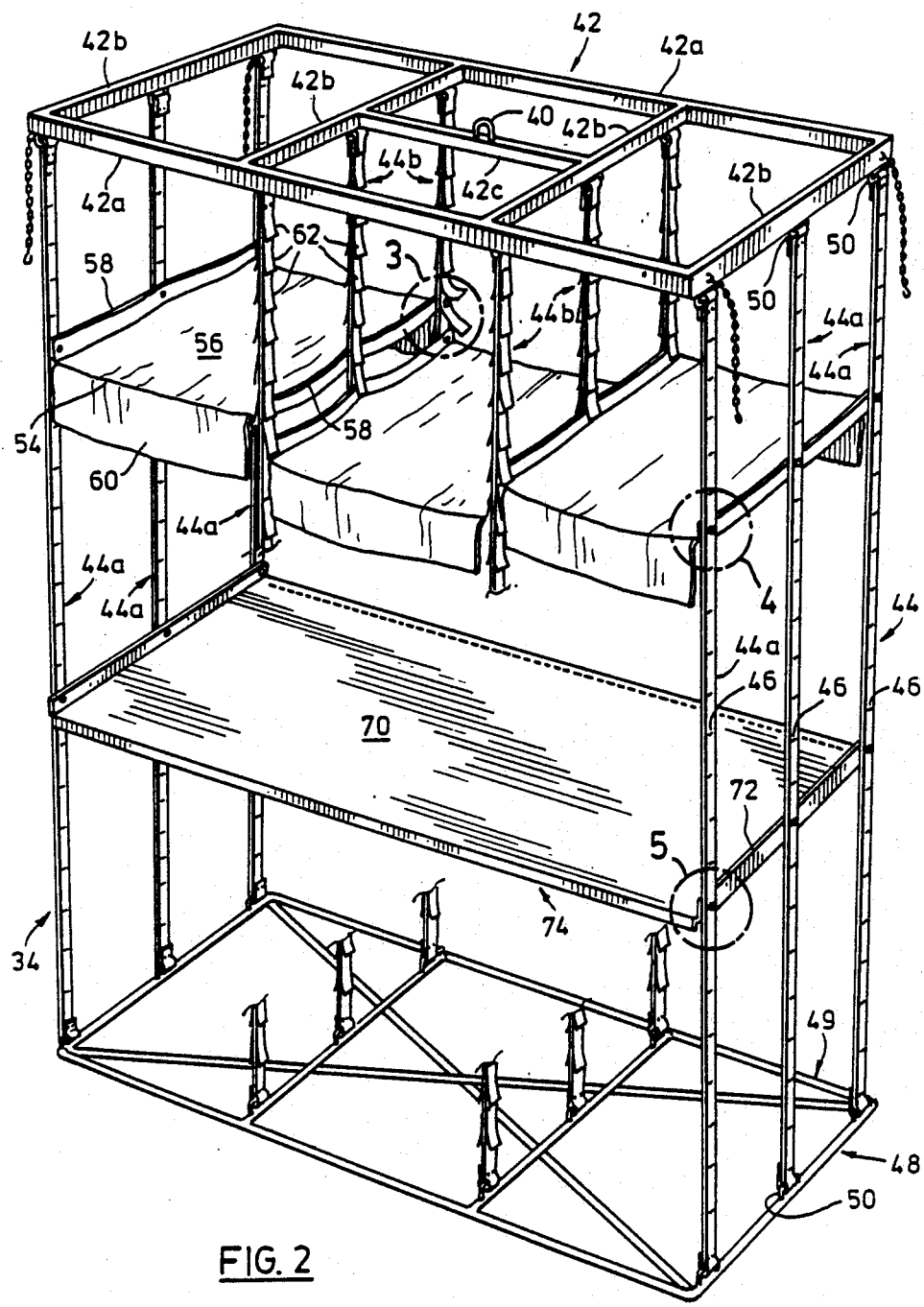
FIG. 2 is a perspective view of one of the uncollapsed transporter modules of FIG. 1.

FIG. 2 is a perspective view of one transporter module according to the present invention, which is indicated generally at 34, and a description of the features common to the transporter modules will be made, with reference to this FIG. 2. The transporter module 34 comprises a rigid upper frame indicated generally at 42, twelve vertically elongate support members or straps 44, a rigid lower frame 48 and flexible shelf members 54. Also shown is a rigid shelf member 70, which is described in more detail below.

The upper rigid frame 42 is composed of end members 42a, four cross members 42b, and a middle member 42c. Members 42a are designed to be easily accommodated within the width of a standard transportation vehicle. Members 42a may be of any length, and can be designed to accommodate different sized components being transported. The loop 40 is attached to middle member 42c, whereby loop 40 is located at the center of upper rigid frame 42. The hook 30 of the mounting means can be inserted through loop 40, as shown in FIG. 1, to support the transporter module 34.

The elongate support members 44 are attached to loops 50 extending from the lower face of cross members 42b. In the preferred embodiment, three support members 44 are attached to each cross member 42b. The support members 44 may be either end support members 44a or middle support members 44b, as discussed in more detail below.

Each support member 44 has a plurality of grommets 46 (FIGS. 3–5) evenly spaced along its length. The support members 44 are preferably made from a strong flexible lightweight fabric, such as woven nylon or the like. The support members 44 are just long enough so that lower rigid frame 48 does not come into contact with the floor of the transportation vehicle 2.

Figure 7:
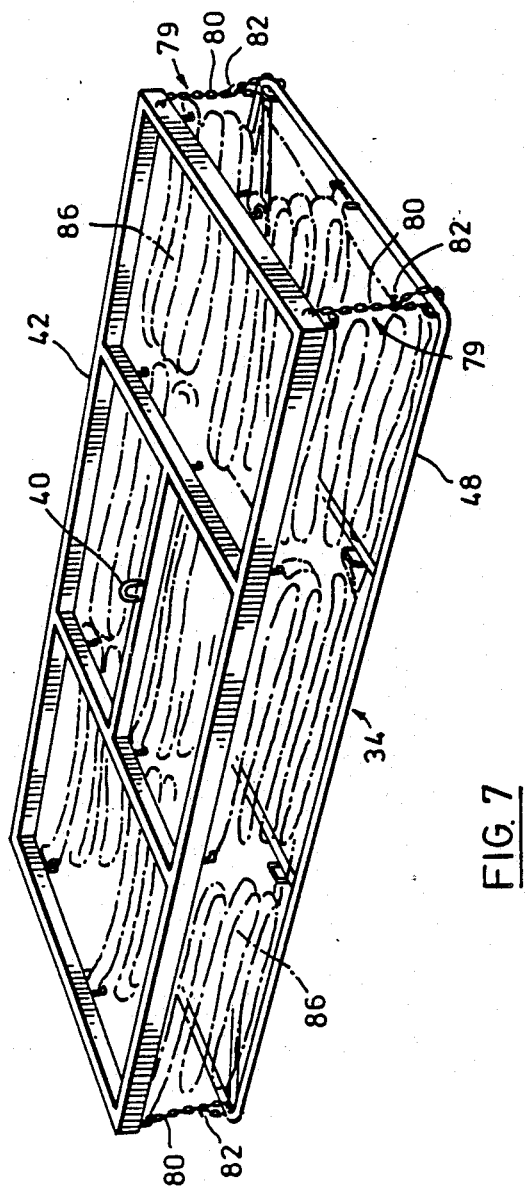
FIG. 7 is a perspective view showing a transporter module secured in collapsed form.

The lower rigid frame 48 is located at the lower end of support members 44, as shown in FIG. 2. Further loops 50 extending from upper face 49 of lower rigid frame 48 may be used to attach support members 44 to frame 48. It will be appreciated that lower rigid frame 48 does not have to be as strong as the upper rigid frame 42; the lower rigid frame 48 is merely to retain the support members 44 and flexible shelf members 56 in a collapsed position, as shown in FIG. 7, and to maintain the spacing of the support straps 44 where non-rigid shelf members 54 are used.

In one embodiment of the invention, flexible shelf members 54 are provided, which have a horizontal web 56, reinforced side edges 58 and at least one protective flap such as front flap 60. The front flap 60 may be padded to provide better protection.

Figure 3:
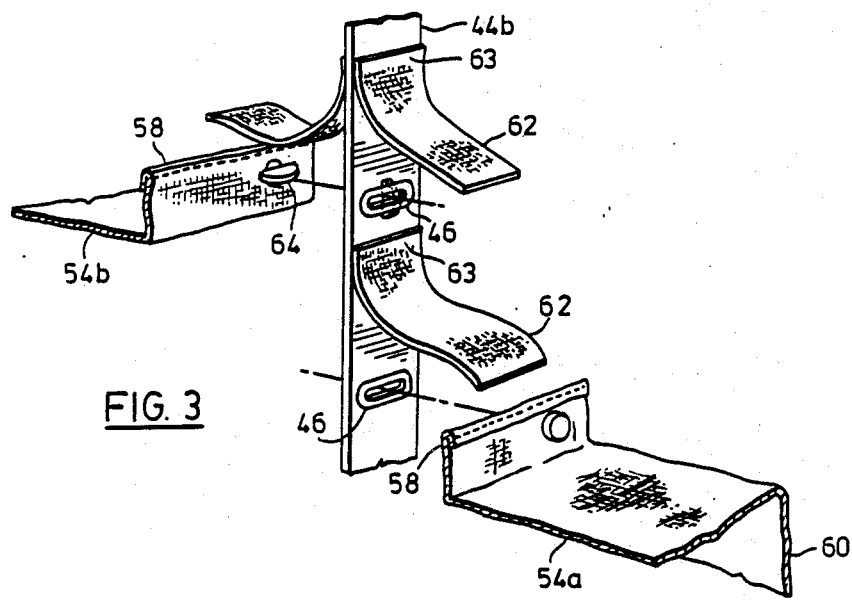
FIG. 3 is an enlarged view of circle 3 of FIG. 2.

Located along reinforced side edges 58 of the shelf members 54 are male attachment members 64, which can be releasably locked in grommets 46 to adjustably attach shelf members 54 to support members 44, as shown in FIG. 3.

In FIG. 3 a middle support member 44b is shown in detail. As can be seen from FIG. 2, the middle support member 44b has a plurality of side flaps 62. An upper end 63 of each side flap 62 is attached to the support member 44b above each grommet 46 to cover it. The side flaps 62 are located on each side of support members 44b and prevent male attachment members 64 from coming into contact with the goods 25 being transported.

Also shown in FIG. 3 are two horizontally adjacent shelf members, given the references 54a and 54b each. Because each male attachment member 64 fully occupies any particular grommet 46, the shelf members 54a and 54b cannot be at the same level. Therefore, shelf member 54b must be displaced one grommet 46 vertically either up or down. In FIG. 3, the shelf member 54b is displaced up from the shelf member 54a.

Figure 4:
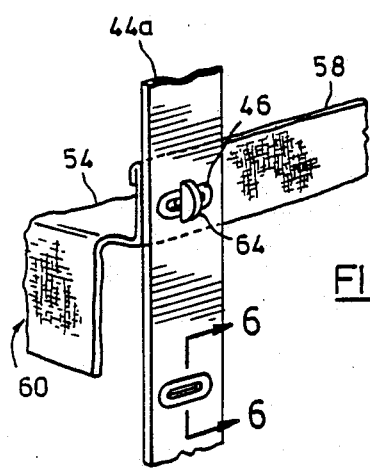
FIG. 4 is an enlarged view of circle 4 of FIG. 2.

FIG. 4 shows a shelf member 54 attached to an end strap or support member 44a. The male attachment member 64 has been inserted through grommet 46 and has been locked in place by being rotated 90°. Also shown is a front flap 60, which hangs down from the shelf member 54. The front flap 60 prevents components 25 in adjacent transporter modules, for example modules 22 and 24 as shown in FIG. 1, from coming into contact while being transported. Front flap 60 comes between components on the shelf member below the shelf, from which front flap 60 hangs, to protect the components 25 on either side of the flap 60.

Figure 6:
FIG. 6 is a section through line 6—6 of FIG. 4.

FIG. 6 is a section through line 6—6 of FIG. 4 and shows the grommet 46 opening on both sides of its support member 44.

FIG. 7 shows the transporter module 34 in a collapsed mode. A securing means indicated generally at 79 is used to retain upper rigid frame 42 and lower rigid frame 48 close together, with support members 44 and shelf members 54 collapsed in bundles as indicated generally at 86. Although four are shown, it will be appreciated that two may only be required.

Each securing means 79 comprises a chain 80 attached at one end to upper rigid frame 42 and having a hook 82 at the other end. Chain 80 is looped around lower rigid support 48, and hook 82 is inserted into an appropriate link. In this manner, the module is releasably secured in a collapsed mode.

Figure 5:
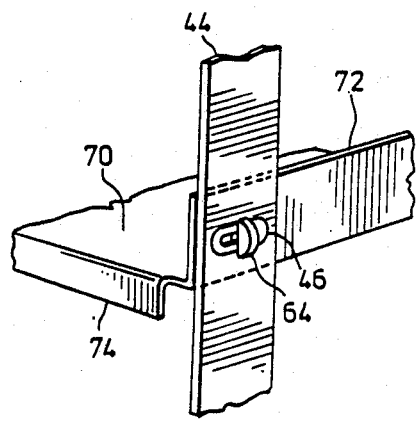
FIG. 5 is an enlarged view of circle 5 of FIG. 2.

FIG. 2 and FIG. 5 also show a second embodiment of the invention having a rigid shelf member 70. As can be seen from FIG. 2, the rigid shelf member 70 extends between end support members 44a. Consequently, middle support members 44 are not required. As can be seen from FIG. 5, the end wall 72 of rigid shelf member 70 has a male attachment member 64 for insertion into grommet 46, in the same manner as previously described.

When in use, a transportation module, for example 27, would be loaded with components 25 at the supplier's plant. The vertical spacing between the shelf members 54 could be easily adjusted beforehand, to ensure that adequate spacing was provided for each separate item. Then the loaded module 22 would be loaded into the transportation vehicle.

Then, more loaded modules would be placed into the transportation vehicle, until it was filled from front to back. Front flaps 60 and side flaps 63 will prevent the components 25 from coming into damaging contact with each other, or with the male attachment members 64 respectively, during the transportation vehicle's journey from the supplier's plant to the manufacturing or assembly plant.

Once lined up in the loading bay, the transporter modules can be unloaded from the vehicle, and then the modules themselves can be unloaded. Then, the modules can either be collapsed, and the transportation vehicle loaded with a return payload, or the spacing of the shelf members can be adjusted, and the modules can be reloaded with some other goods for the return journey.

I claim:

1. A collapsible transporter module for transporting goods in a transporter vehicle or container having at least one overhead rail, said module comprising:

means for slidably suspending said module from said overhead rail;

an upper rigid frame suspended from said mounting means having two end members and four evenly spaced apart cross members attached to said end members, the outermost cross members at either end joining the ends of said end members to form a rectangle;

three vertically elongate collapsible end support members suspended from each of said outermost cross members, said end support members having a plurality of female attachment members attached thereto;

three vertically elongate collapsible middle support members suspended from each of said other two cross members, said middle support members having a plurality of female attachment members opening on two sides of said middle support member, said middle support member having flaps overhanging each of said openings for each of said female attachment members;

a lower rigid frame attached to the other end of said middle and end support members;

a plurality of flexible shelf members having two reinforced side edges, a front edge and a back edge, and a padded flap hanging from at least one of said front or back edges;

said reinforced side edges having male attachment means for adjustable attaching said shelf members to said middle and end support members; and a securing means for storing said module in a collapsed mode when said module not being used for transporting goods.

* * * * *